United States Patent [19]
Hallock

[11] Patent Number: 6,007,885
[45] Date of Patent: Dec. 28, 1999

[54] OXYGEN SCAVENGING COMPOSITIONS AND METHODS FOR MAKING SAME

[75] Inventor: John Scott Hallock, Ellicott City, Md.

[73] Assignee: W.R. Grace & Co.-Conn., New York, N.Y.

[21] Appl. No.: 09/044,277

[22] Filed: Mar. 19, 1998

[51] Int. Cl.[6] .................................................. B32B 27/08
[52] U.S. Cl. ................................ 428/35.7; 252/188.21; 252/188.22; 252/188.23; 206/524.6
[58] Field of Search ..................... 428/35.7; 206/524.6; 252/188.21, 188.22, 188.23

[56] References Cited

U.S. PATENT DOCUMENTS

| | | | |
|---|---|---|---|
| 4,360,120 | 11/1982 | Samuel et al. | 524/494 |
| 4,368,828 | 1/1983 | Samuel et al. | 220/81 R |
| 4,529,740 | 7/1985 | Trainer | 521/84 |
| 4,536,409 | 8/1985 | Farrell et al. | 426/398 |
| 4,619,848 | 10/1986 | Knight et al. | 428/35 |
| 4,698,469 | 10/1987 | Pham et al. | 200/148 |
| 4,702,966 | 10/1987 | Farrell et al. | 428/500 |
| 5,014,447 | 5/1991 | Hagen | 34/156 |
| 5,075,362 | 12/1991 | Hofeldt et al. | 524/72 |
| 5,211,875 | 5/1993 | Speer et al. | 252/188.28 |
| 5,284,871 | 2/1994 | Graf | 514/499 |

FOREIGN PATENT DOCUMENTS

| | | |
|---|---|---|
| 0129309 | 12/1984 | European Pat. Off. . |
| 0182674 | 5/1986 | European Pat. Off. . |
| 3639426 C1 | 10/1987 | Germany . |
| 1112023 | 5/1968 | United Kingdom . |
| 1112024 | 5/1968 | United Kingdom . |
| 1112025 | 5/1968 | United Kingdom . |
| 2084061 | 4/1982 | United Kingdom . |
| WO 91/17044 | 11/1991 | WIPO . |

OTHER PUBLICATIONS

Z. anorg.allg. Chem. 499, "$NaM_2OH(SO_3)_2\ 1\ H_2O\ldots$". pp. 99–108, Lutz et al, 1983.

Z. Naturforsch 41 b, "Kristallstrukturen von . . . ", pp.852–858, Buchmeier et al, 1986.

Chem. Eng. Comm, Vol. 112, "Precipitation in the . . . ", pp. 31–38, Rieger et al, 1992.

*Primary Examiner*—Charles Nold
*Attorney, Agent, or Firm*—Craig K. Leon; William L. Baker

[57] ABSTRACT

An oxygen scavenging composition capable of providing good oxygen absorption capabilities wherein the oxygen scavenging agent is a hydroxosulfitometalate. Methods for making a hydroxosulfitometalate are also disclosed.

27 Claims, No Drawings

OXYGEN SCAVENGING COMPOSITIONS AND METHODS FOR MAKING SAME

FIELD OF THE INVENTION

The present invention relates to novel compositions useful for retaining product quality and improving shelf life of oxygen sensitive materials, and processes for making the compositions. The compositions can be formed into films, coatings, 3-dimensional solids, fibers, webs, and shaped products or structures which are incorporated into, applied to, or otherwise become a part of a container structure, including container closures, sealants, gaskets, liners, and the like.

BACKGROUND OF THE INVENTION

In order to enhance preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a shaped container body that is provided with a lid or other separate closure. The polymeric sheet material may constitute some or all of the interior exposed surface area of the container or its closure means.

It is known to include an oxygen scavenger agent in sheet material. The oxygen scavenger agent reacts with oxygen that is trapped in the package or that permeates into the package. This is described in, for instance, U.S. Pat. Nos. 4,536,409 and 4,702,966 and the prior art discussed in these references. U.S. Pat. No. 4,536,409, for example, describes cylindrical containers formed from such sheet material and provided with metal lids.

When the container is formed of a glass or metal body and is provided with a hermetically sealed metal closure, the permeation of oxygen through the body and the closure is theoretically impossible because of the impermeability of the materials forming the body and closure. As a practical matter, metal cans can reliably prevent oxygen ingress. However, some oxygen ingress may occur by diffusion through the gasket or the like positioned between a container body and its lid. It has long been recognized that when conventional containers of these types are used for the storage of oxygen sensitive materials, the shelf life of the stored materials is very limited. The quality of the packaged material tends to deteriorate over time, in part because dissolved oxygen typically is present in the pack from the time it is filled; and in part due to oxygen ingress which occurs during storage.

When the container is a can, the can end or other closure often includes push and pull components which are manipulated by pushing and/or pulling to permit removal of a fluid or other material from the container without removing the entire closure from the container. These push or pull components are often defined by discontinuities or lines of weakness in the panel of the closure. Problems that can arise at these lines of weakness or discontinuities include the risk of permeation of oxygen into the container and the risk of corrosion of the metal where the normal protective lacquer coating is ruptured at the lines of weakness or discontinuities.

It is desirable to extend shelf life using conventional materials to fabricate the container body, closure, and, where possible, gasket between body and closure.

Various types of oxygen scavengers have been proposed for this purpose. For example, it is well known to package iron powder in a sachet for use with dry foods. See Mitsubishi Gas Chemical Company, Inc.'s literature titled "Ageless®—A New Age in Food Preservation" (date unknown). However, these materials require the addition of water soluble salts to enhance the oxygen scavenging rate and, in the presence of moisture, the salts and iron tend to migrate into liquids, producing off-flavors. Similarly, U.S. Pat. No. 4,536,409 issued to Farrell et al. recommends potassium sulphite as a scavenger, with similar results. U.S. Pat. No. 5,211,875 issued to Speer et al. discloses the use of unsaturated hydrocarbons for use as oxygen scavengers in packaging films.

It is known in the art that ascorbic acid derivatives (ascorbic acid, its alkali metal salts, optical isomers, and derivatives thereof) as well as sulfites, bisulfites, phenolics, etc. can be oxidized by molecular oxygen, and can thus serve as an oxygen scavenging material, for example, as a component of a closure compound. For example, U.S. Pat. No. 5,075,362, issued to Hofeldt et al., discloses the use of ascorbate compounds in container closures as oxygen scavengers.

U.S. Pat. No. 5,284,871 issued to Graf relates to the use of an oxygen scavenging composition made of a solution of a reducing agent and dissolved species of copper which are blended into foods, cosmetics and pharmaceuticals. Copper ascorbate is used in the examples. The reference indicates that relatively high level of $Cu^{2+}$ (~5 ppm) are required in the food for scavenging to be effective but indicates that small amounts of the $Cu^{2+}$ can combine with oxygen in food to cause food spoilage. In order to avoid spoilage, one is required to reduce the amount of headspace $O_2$ or partially flush the container with an inert gas (Col. 5, lines 32–39). A paper by E. Graf, "Copper (II) Ascorbate: A Novel Food Preservation System", Journal of Agricultural Food Chemistry, Vol. 42, pages 1616–1619 (1994) identifies copper gluconate as a preferred raw material.

It is also well known in the scientific literature (See "Polymer Compositions Containing Oxygen Scavenging Compounds", Teumac, F. N.; et al. WO 91/17044, published Nov. 4, 1991, filed on May 1, 1991) that the oxidation rate of ascorbic acid derivatives can be increased significantly by the use of catalysts. Typical oxidation catalysts for ascorbic acid and its derivatives are water soluble transition metal salts. When such catalysts are combined with an ascorbic acid derivative in a polymeric matrix, e.g., a PVC closure formulation, they are effective in catalyzing the oxidation of the ascorbic acid derivative, and increase its oxygen scavenging rate.

In each of the above references, the active component of the oxygen scavenging systems utilized agents which readily transfer into the food or other packaged product or materials or which produce oxidation by-products which are known to adversely affect a wide range of packaged material.

SUMMARY OF THE INVENTION

Novel compositions of the present invention comprise a carrier and oxygen scavenging hydroxosulfitometalate which provide the ability to combine chemically with oxygen in the interior of containers while avoiding undue migration of the oxygen scavenging agent or its oxidation by-product(s) from the carrier. The inhibition of migration significantly reduces or eliminates adverse effects on the color, taste, or smell of articles in contact with the polymer carrier. High levels of the scavenging agent, which may be triggered by moisture, can be used without fear of having excessive amounts of the agent becoming an extraneous material in the packaged food article.

An exemplary composition of the invention comprises a carrier, preferably comprising at least one polymer and optionally one or more additives (e.g., fillers, surfactants, plasticizers, stabilizers, antioxidants and others); and an oxygen scavenger hydroxosulfitometalate represented by the formula $M^I M^{II}{}_2 OH(SO_3)_2 \cdot H_2O$ wherein $M^I$ is a monovalent cation; and $M^{II}$ is a divalent metal cation. $M^I$ comprises a monovalent inorganic or organic cation such as $Li^+$, $Na^+$, $K^+$, $NH_4^+$, or $NR_4^+$ where R can be hydrogen, an alkyl or aryl moiety, or mixture thereof. $M^{II}$ comprises a divalent metal cation such as $Ca^{2+}$, $Mg^{2+}$, $Mn^{2+}$, $Zn^{2+}$, $Fe^{2+}$, $Co^{2+}$, $Ni^{2+}$, $Cu^{2+}$, or mixture thereof. Preferably, the amount of hydroxosulfitometalate is 0.05–90% weight based on total weight of composition, and the carrier comprises at least one polymer conventionally used in packaging, containers, and container closures, including gaskets, sealants, cap disc liners, and the like. For example, the carrier may comprise a thermoplastic resin such as polyethylene, an ethylene/vinyl acetate copolymer, a vinyl chloride homopolymer, a vinyl chloride copolymer, or a blend thereof. In view of the teachings herein, it is believed that the skilled artisan can make suitable selections of the amount of the oxygen scavenging agent and choice of polymer carrier depending upon the situation at hand.

The present invention is further directed to a shaped structure containing or derived from the subject composition, as well as to containers, including closures, such as closure sealants, closure gaskets, fluid-applied sealant compositions (e.g., melt-applied crown cap gasket compositions), cap liner discs, and the like, formed with or containing the subject composition.

Novel methods of the present invention for making the above-described compositions of the invention are surprisingly found to provide good hydroxosulfitometalate yield from inexpensive starting materials and/or improved oxygen scavenging capability. Thus, an exemplary method of the invention comprises: reacting, in aqueous slurry or solution substantially free of oxygen, (1) a metal oxide having the formula $M^{II}O$ or metal hydroxide having the formula $M^{II}(OH)_2$, wherein, in said formulae, $M^{II}$ is a divalent metal cation; and (2) a bisulfite salt having the formula $M^I HSO_3$ or a metabisulfite salt having the formula $M^I{}_2 S_2 O_5$, wherein, in said formulae, $M^I$ is a monovalent cation.

A further exemplary method of the present invention, which allows for preparation of hydroxosulfitometalate on an inorganic support, comprises: reacting a water-soluble source of divalent metal cations with a water-soluble source of sulfite anions, in an aqueous slurry or solution substantially free of oxygen, and in the presence of a substantially non-water-soluble inorganic substrate material. An exemplary water-soluble source of divalent metal cations (such as $Ca^{2+}$, $Mg^{2+}$, $Mn^{2+}$, $Zn^{2+}$, $Fe^{2+}$, $Co^{2+}$, $Ni^{2+}$, and $Cu^{2+}$) comprises a metal halide $M^{II}X_2$ wherein X is a halide, such as $MgCl_2$. An exemplary water-soluble source of sulfite anions includes sulfites $M^I{}_2 SO_3$, bisulfites $M^I HSO_3$, metabisulfites $M^I{}_2 S_2 O_5$, or mixtures thereof, wherein $M^I$ comprises a monovalent inorganic or organic cation comprising $Li^+$, $Na^+$, $K^+$, $NH_4^+$, or $NR_4^+$ where R can be hydrogen, an alkyl or aryl moiety, or mixture thereof. Exemplary substantially non-water-soluble inorganic support or substrate include silicas (including colloidal, precipitated, fumed), clays or clay-like particulate materials (e.g., montmorillonite, vermiculite), metal oxides (e. g, spinel $M_g Al_2 O_4$), metal hydroxides, hydrotalcites and calcined hydrotalcites, aluminas, and zeolites.

Further features and benefits of the present invention are described hereinafter.

DETAILED DESCRIPTION OF PREFERRED EMBODIMENTS

The present invention is directed to an oxygen scavenging composition formed of a carrier, preferably polymeric, containing an effective oxygen scavenging amount of hydroxosulfitometalate (which may occasionally be referred to herein as "HSM") material distributed within the carrier material or upon a surface thereof in the manner of a support, or both contained within and located upon the carrier material, as fully described herein below.

The carrier can comprise one or more polymers and optional additives (e.g., fillers, plasticizers, surfactants, etc.) forming a matrix in which the subject particulate HSM material is substantially uniformly distributed, or a film or mat (woven or non-woven) having the subject particulate HSM material substantially uniformly distributed therein and/or deposited thereon, or a moisture permeable pouch or sachet which contains the subject particulate HSM material therein.

The present invention further provides an improved container for packaging materials, such as food, beverages and the like, which are susceptible to oxidative degradation. The present improved container is capable of retaining product quality and enhanced shelf life of the packaged material without adversely affecting the color, taste or smell of the packaged material by the present oxygen scavenging composition. It further provides a packaging system which can have high levels of oxygen scavenger agent therein while meeting government regulatory standards related to amounts of such agents contained in food products.

HSMs are layered inorganic structures. An exemplary composition of the invention comprises: a carrier having an oxygen scavenger hydroxosulfitometalate represented by the formula

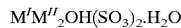

wherein $M^I$ is a monovalent cation; and $M^{II}$, is a divalent metal cation. Preferably, $M^I$ comprises a monovalent inorganic or organic cation such as $Li^+$, $Na^+$, $K^+$, $NH_4^+$, or $NR_4^+$ where R can be a hydrogen, an alkyl or aryl moiety, or mixture thereof, and $M^{II}$ comprises a divalent metal cation such as $Ca^{2+}$, $Mg^{2+}$, $Mn^{2+}$, $Zn^{2+}$, $Fe^{2+}$, $Co^{2+}$, $Ni^{2+}$, $Cu^{2+}$, or mixture thereof.

The oxygen scavenging agent of the present invention has been found to provide effective oxygen scavenging activity and rate when the agent is placed in the presence of oxygen and moisture. Thus, the presently described oxygen scavenging compositions of the invention must be maintained in the absence of oxygen during formation and the absence of oxygen or moisture during storage. When the present agent is formulated into an oxygen scavenging composition with a carrier, such as a polymeric matrix, the carrier should be able to maintain the agent substantially free from moisture to the degree needed to trigger (initiate) a high rate of oxygen scavenging to occur to provide preservation of the packaged goods contemplated.

The compositions of the invention have been unexpectedly found to provide a desirable means of providing a large degree of oxygen scavenging activity to the subject composition and, thereby, provide enhanced capacity and activity to scavenge oxygen while not allowing the initial oxygen scavenging material and/or any resultant oxidation by-product migrate into or adversely effect the color, taste or smell of articles in contact with the subject composition.

The amount of oxygen scavenging agent will depend on the anticipated application of the resultant scavenging composition. When large amounts of composition are used to scavenge small volumes of oxygen (such as might be the case if a relatively thick polymeric coating were used to coat the entire interior surface of a can), the amount of oxygen scavenging agent can be as low as about 0.05 weight percent of the composition and preferably at least 1 weight percent of the composition. Generally speaking, the HSMs may be used in the range of 0.05–90% based on total weight of the composition; more preferably 0.5–40%; and most preferably 1.0–25% based on total weight of composition. In some conventional applications, such as cap liners, crown gasket compositions, can sealants, and the like, where the loading of the particulate in the polymer carrier is low and/or the amount of composition is small, the amount of oxygen scavenging agent can be at least about 1 weight percent, preferably from 2 to 40 weight percent, and more preferably from 3 to 25 weight percent based on the weight of the composition.

The amount of oxygen scavenging agent required for a particular application can be readily determined by the artisan. When the oxygen scavenger particulate is incorporated into a gasket, the amount is normally at least 0.05 weight percent based on the carrier, generally at least 1% and preferably at least 2%. In the case of a plastisol, lacquer, or hot melt applied to the center panel of a closure, where the carrier does not otherwise serve as a gasket, the amount can be much higher. For example, loadings of 20 weight percent to 60%, or in some cases up to 90% are workable. When the composition is in the form of a film, mat, pouch or sachet, the oxygen scavenger should be present in an amount to effectively scavenge oxygen during the contemplated storage period of the container for the appropriate contents. The present invention provides the ability to achieve a wide range of scavenger agent content including high weight percentages.

An exemplary HSM suitable for use in the present invention is a finely divided solid that is particularly suited to replace part or all of the filler commonly found in sealant, coating, or film compositions which are applications contemplated herein. The subject composition as a whole is effectively anhydrous, that is, it provides a moisture content lower than needed to trigger (initiate at a substantial rate) oxygen scavenging. Thus, it is preferred that the carrier component of the composition be a polymeric matrix (i.e., a three-dimensional structure into which the HSM is incorporated). Generally, the polymeric matrix substantially protects the scavenger from moisture under normal atmospheric conditions and, therefore the oxygen scavenger agent remains substantially inert to scavenging activity. However, once a high degree of moisture is attained, as in a closed package environment of food products, the scavenging activity is initiated or triggered. Moisture ingress into the polymeric matrix carrying the HSM may optionally be accelerated by hot filling, sterilization, pasteurization, retort, and the like. A carrier comprised of a polymeric matrix should be sufficiently permeable to permit moisture and oxygen to pass into the matrix to contact the particulate HSM material.

In one embodiment of the present invention, the carrier of the subject composition comprises at least one polymer matrix, that is to say polymeric material (including optional additives such as plasticizers, fillers, surfactants, etc.) that will form a solid matrix having distributed therein the oxygen scavenging particulate HSM material. The polymeric matrix carrier will be selected with regard to the nature of the composition (e.g., dispersion, latex, plastisol, dry blend, solution or melt) and its utilization as part of the container and/or closure.

The polymeric matrix material may be chosen from at least one polymeric material that can form a solid or semi-solid matrix. The polymeric carrier can be derived from a variety of polymers which are available from a variety of bulk physical configurations such as dispersion, latex, plastisol, dry blend, solution, or melt (e.g., thermoplastic meltable polymer). The particular physical configuration of the polymer selected will depend on the end structure into which the subject composition is eventually formed or incorporated. The polymeric matrix is derived from polymer types which may be thermoplastic or thermosetting.

The primary functions served by the polymer matrix for purposes of the present invention are to provide a compatible carrier (a material which is stable under normal packaging temperature conditions and does not deactivate the oxygen scavenger agent) for the HSM oxygen scavenging agent as described herein and to permit ingress of both oxygen and water into the composition and to permit them to come into contact with the HSM oxygen scavenging agent. The scope of the polymer(s) in general can be very broad. However, the polymer matrix may also be selected to perform additional functions depending on the physical configuration in which it is provided in a final structure into which it is shaped or incorporated. Thus, the particular polymer or mixture of polymers selected ultimately will be determined by the end use in which it exerts its oxygen scavenging effect.

Accordingly, suitable polymers from which an exemplary polymeric matrix of the present invention may be derived include polyolefins, vinyl polymers, polyethers, polyesters, polyamides, phenol-formaldehyde condensation polymers, polysiloxanes, ionic polymers, polyurethanes, acrylics and naturally occurring polymers such as cellulosics, tannins, polysaccharides, and starches.

Suitable materials for use as polymeric matrix carriers in the form of latex compositions, such as for can ends, are described in U.S. Pat. No. 4,360,120; U.S. Pat. No. 4,368,828 and EP 0182674. Suitable polymeric materials for use when the compositions are organic solutions or aqueous dispersions are described in U.S. Pat. No. 4,360,120; U.S. Pat. No. 4,368,828; and GB 2,084,601. Suitable materials for use in thermoplastic compositions include the materials proposed in U.S. Pat. No. 4,619,848; U.S. Pat. No. 4,529,740; U.S. Pat. No. 5,014,447; U.S. Pat. No. 4,698,469; GB 1,112,023; GB 1,112,024; GB 1,112,025 and EP 129309. The teachings of each of the references cited herein above are incorporated herein by reference in their entirety.

In particular, the polymeric material can be generally selected from polyolefins as, for example, polyethylene, polypropylene, ethylene/propylene copolymers, acid modified ethylene/propylene copolymers, polybutadiene, butyl rubber, styrene/butadiene rubber, carboxylated styrene/butadiene, polyisoprene, styrene/isoprene/styrene block copolymers, styrene/butadiene/styrene block copolymers, styrene/ethylene/butylene/styrene block copolymers, ethylene/vinyl acetate copolymers, ethylene/acrylate and ethylene/(meth) acrylate copolymers (for instance, ethylene/butyl acrylate or ethylene/butyl methacrylate copolymers), ethylene/vinyl alcohol copolymers, ethylene or propylene/carbon monoxide alternating copolymers, vinyl chloride homopolymers and copolymers, vinylidene dichloride polymers and copolymers, styrene/acrylic polymers, polyamides, and vinyl acetate polymers, and blends of one or more of these. Polyethylenes found useful in forming the subject composition include high density polyethylene (HDPE), low density polyethylene (LDPE), linear low density polyethylene (LLDPE), ultra-low density polyethylene (ULDPE) and the like as well as copolymers formed from ethylene with one or more other lower alkenes (e.g., octene) and the like.

Compositions according to the invention may comprise a thermoplastic polymer as, for example, polyethylene or copolymers of polyethylene such as, ethylene/vinyl acetate and the like or polyethylene blends such as, blends of HDPE and butyl rubber; polyethylene and ethylene/vinyl acetate copolymer; as well as polyethylene and styrene/butadiene/styrene block polymer and the like. The polyethylene, if used, is preferably a low density polyethylene, and may be a very low or ultra low density polyethylene which may be branched or linear. The ethylene/vinyl acetate copolymer, if used, preferably has a melt index in the range 3 to 15, preferably 5 to 10, and generally contains 5 to 40%, preferably 5 to 30%, vinyl acetate.

Particularly preferred compositions are a plastisol or a dry blend of polymer may be used in combination with a plasticizer for forming the polymer matrix. Suitable materials for use when the compositions are plastisols include vinyl chloride homopolymers and copolymers. Instead of preparing such compositions as true plastisols, they may be provided as dry blends of the polymer and plasticizer. The proportion of plasticizer present in a vinyl resin plastisol may be any conventional proportion, typically from 30 to 150 weight parts of plasticizer per hundred weight parts of vinyl resin.

The polymer carrier may be formed from various thermosetting resins such as polyurethanes, phenolics, epoxy-ester resins, epoxy resins, polyesters and alkyds. These resins are normally formed into solutions or suspensions with organic liquids and applied to the inner surface of a container followed by application of elevated temperature to remove the liquid and cause solidification (e.g., by crosslinking) of the resin coating on the substrate.

Exemplary polymeric carriers of the invention may further contain conventional plasticizers, including phthalates, adipates, glycols, citrates and epoxidized oils and the like. Examples include for example dioctyl phthalate, diisooctyl phthalate or diisodecyl phthalate, which are readily available. Other usable plasticizers are butyl benzyl phthalate, acetyl tributyl citrate, ethyl diphenyl phosphate and diisobutyl phthalate. One particularly useful combination of plasticizers for use with a vinyl chloride/vinyl acetate copolymer resin is a mixture of diisodecyl phthalate and diisooctyl phthalate in a weight ratio of about 7–8:1.

A preferred aspect of the invention is that the HSM oxygen scavenger agent should remain substantially inert in the composition and in the gasket or other solid deposit formed with the subject composition until the composition is on or in a sealed container or closure. Exposure of the composition to high humidity that normally exists within a sealed container will, therefore, result in sufficient permeation of moisture into the composition and cause the subject oxygen scavenger to initiate a satisfactory degree of scavenging. This will result in improved shelf life of the packaged material. In addition, the scavenging reaction can be accelerated by heating the composition sufficiently while in the closed container to cause increased permeation of moisture. Thus, the HSM oxygen scavenger agent preferably remains substantially inert in or on the carrier until the scavenging reaction is initiated by moisture. Where the subject oxygen scavenger agent has a sufficient amount of water molecules associated with it to provide moisture required to cause oxygen scavenging, it is preferred that compositions having such hydrated particulate material be stored under an inert atmosphere until used.

Preferably, the oxygen scavenging reaction of the present composition is accelerated by pasteurizing (typically at 50°–100° C.) or sterilizing (typically at 100°–150° C.) the container after filling it with an aqueous fill and sealing it. This triggering appears to be a consequence of the subject composition, when heated, permitting moisture to permeate into the composition and contact the subject oxygen scavenger agent. The moisture becomes trapped in the composition, thereby bringing the scavenger agent into contact with sufficient water to permit reaction with the oxygen present. This oxygen may permeate through the composition either from oxygen trapped within the container when it was filled or which subsequently enters the container from the surrounding atmosphere.

While some conventional oxygen scavenging agents degrade when subjected to elevated temperatures, the subject oxygen scavenger agent has been found to be stable to elevated temperatures commonly experienced in processing polymers into films or coatings, removing solvents from plastisol compositions, pasteurization, sterilization and the like processes commonly encountered in packaging technology.

Exemplary carriers of the invention may further contain inert filler, slip aids, process aids, pigments, stabilizers, anti-oxidants, tackifying resins, foaming agents and other conventional additives in conventional amounts, depending upon the nature of the composition and its final use. If the carrier comprises a thermoplastic polymer, the total amount of such additives is generally below 10%, most preferably below 3%, based on the total weight of the composition. However, when the carrier is in the form of a plastisol, dispersion, organic solution or latex, the amounts of additives based on total weight of the composition may be higher. When an anti-oxidant is incorporated, it should be present in amounts capable of stabilizing the polymeric composition against degradation due to free-radicals formed during processing. However, the amount of anti-oxidant should be small enough to permit the subject HSM oxygen scavenger agent of the composition to effectively react with molecular oxygen. The specific amount will depend on the anti-oxidant used and can be determined by minor experimentation.

The composition of the invention may be formulated in any convenient form, such as a melt, plastisol, organic solution, dry blend, latex or dispersion. The main ingredients of the composition, apart from the HSM oxygen scavenger agent, may comprise conventional materials. It is preferred that the total composition should be non-aqueous (i.e., an anhydrous solution, plastisol or thermoplastic melt) so as to prevent initiation of the reaction of the HSM scavenging agent within the composition.

The carrier of the present invention may be selected from those used to form coatings on at least a portion of the interior surface of a package (e.g., a rigid container such as a can, can lid, box, carton, or the like). Polymers contained in the carrier may be selected from polymer classes commonly referred to as epoxides, phenolics (e.g., phenol-formaldehyde condensation polymer), lacquers (e.g., cellulose esters or ethers, shellac, alkyl resins and the like), polyurethanes and the like. The polymer carrier may be mixed with the above described oxygen scavenger agent to provide an encapsulated particulate which may be subsequently used in a second carrier or applied onto (such as by solvent or melt application) the surface of a second carrier material.

The subject composition can also be utilized to form a carrier film which carries the present oxygen scavenger agent. The carrier can be formed from a polymeric material, such as those described herein above, capable of forming a film and upon the surface thereof is deposited the present oxygen scavenger. The film may be composed of a single layer or of a plurality of layers. The surface of the film can be coated with the subject HSM oxygen scavenger agent by forming a suspension or dispersion of the particulate in a polymer and depositing the suspension or dispersion by a conventional means, such as spraying or knife coating application or the like, directly onto the film surface. The particular nature of the carrier film will depend upon the application contemplated and the ability of the carrier formed to have the oxygen scavenger adhered to its surface and substantially retain its integrity during use.

The carrier can, alternately, be in the form of a fibrous (woven or non-woven) mat. The subject oxygen scavenger composition is contained in the interstices of the mat structure. The fibers forming the mat may be formed from any suitable material or synthetic fiber such as cotton, glass, nylon, polyethylene, and copolymers of ethylene with one or more ethylenically unsaturated monomer, polypropylene and copolymers of propylene with one or more ethylenically unsaturated monomer and the like. The particular nature of the carrier mat will depend upon the application of its use and the ability of the mat to retain oxygen scavenger material within the interstices of the mat structure during use. The scavenger can be deposited into the mat structure by any means such as by dipping the mat into a dispersion or suspension of the scavenger and then removing the liquid from the mat or by first forming particulates of scavenger/polymer composition which is melt deposited onto and into the mat structure.

In another embodiment, the subject oxygen scavenger composition can be retained within a carrier in the form of a pouch or sachet of suitable size to be inserted in a container having an oxygen sensitive material therein. The pouch or sachet should be sufficiently porous to permit moisture and oxygen to penetrate through the pouch or sachet forming material at ambient temperature conditions. The subject oxygen scavenger composition is thus composed of the pouch or sachet carrier having therein the oxygen scavenger agent, per se, or contained in a polymer matrix and provided for in the form of small particles of sufficient particulate size to permit the sachet structure to retain the particulate therein. The pouch or sachet can be formed from natural or synthetic materials such as paper, cotton cloth, polymer films and the like in manners well known to the packaging technology.

A fourth embodiment is to utilize a carrier in the form of a porous inorganic material, such as a ceramic having the oxygen scavenger agent distributed therein. The ceramic can be formed into any desired shape (e.g., spheres, cubes, cylinders and the like) and size which is suitable for insertion into the container having the oxygen sensitive material. Useful porous inorganic materials include conventional clay, cement pastes and the like.

It has been found that the above described oxygen scavenger compositions can be used for the preservation of oxygen sensitive foods stored at ambient conditions. The present compositions have an advantage over those compositions having oxygen scavengers directly mixed into and forming a filler of a polymer matrix because the present compositions inhibit the release of scavenger agent and/or oxidation by-products which may contaminate the food material. The HSMs of the invention also provide an advantage in that they do not require milling to achieve high oxygen scavenging capability. The HSMs are particulate material that contains, as a part of their structure, a moisture-triggerable oxygen scavenging moiety. It has been found that the nature of the system is such that the oxygen scavenging agent is highly reactive with molecular oxygen yet is bound to the HSM in a manner which substantially prevents migration of the oxygen scavenging moiety or its oxidized product into the packaged material. Therefore, the present invention unexpectedly provides a highly desired oxygen scavenger composition which does not cause discoloration or detract from taste of the packaged food product.

It may be desirable to include in the composition, especially when used as a gasket or the like, a material, which will increase the permeability of the composition to water, for instance a surfactant such as sodium dodecylbenzene sulphonate or other hydrophilic compounds. A suitable amount of a surfactant is between 0.1 and 10.0% by weight of total composition, depending upon the nature of the surfactant. Surfactants may be anionic, non-ionic, and cationic in nature.

The present composition can be used as part of a package container which can provide storage stability to the material packaged therein without detracting from the material's taste, odor or smell. The present composition should be exposed to the inner atmosphere of the resultant sealed container in any form such as a coating on all or a part of the inner surface of the container body or closure means (e.g., lid, can end) or as an insert in the form of a film, mat, pouch, sachet or ceramic structure.

The composition of the invention in the form of a film can, for example, be laminated to paperboard to form gable-top cartons. The film may further comprise oxygen barrier layers and/or heat sealable layers.

The invention formed with a carrier film can be applied as a center panel lining on a container closure. The closure can be a cap, can end, lid stock or film. The invention also includes container closures carrying a solid deposit formed on the closure from a fluid-applied or melt-applied composition, or as a film, that is positioned to seal around, or over a line of weakness in, the closure. The solid deposit can be a gasket deposited around the closure and formed from the composition. Instead of, or in addition to the deposit being such a gasket, the composition can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus, the area of the solid deposit can be very small relative to the area of the container. Despite this, the invention can give greatly improved storage stability to the contents.

The invention also includes filled containers sealed with such closures. The sealed container comprises a container body, the closure fitted on it, and the packaged material that is contained within the container body. The container body is preferably of glass or metal. The closure is preferably of metal. The packaged material can be any beverage, foodstuff or other material that is to be stored within the container but the invention is of particular value when the filling is a material whose shelf-life or product quality is normally restricted due to oxygen ingress or contamination during storage. The container body can be a can, generally of metal, in which event the closure is a can end. Generally the entire closure is of metal or polymeric material but the panel of the closure can include a removable component of either metal or polymeric material.

Instead of a can body, the container body can be a bottle or jar in which event the closure is a cap. The bottle or jar is preferably of glass but it can be of polymeric material with very low oxygen permeability. The cap can be of polymeric material, for instance a polypropylene, that may include a barrier layer. Generally, the cap is formed of metal and may include a push or pull component of metal or polymeric material. The cap may be a crown cap such as a pry-off or twist-off crown, a twist-on cap, lug cap, press-on/twist-off, or press-on/pry-off cap, a screw-on cap, roll-on metal cap, continuous thread cap, or any other conventional form of metal cap or polymeric cap suitable for closing the bottle or jar.

A gasket is normally provided between the container body and the closure. This gasket can be used to carry the composition of the invention (in particular, as a polymer matrix containing composition) either as a blend in the gasket composition or as a separate component applied on or near the gasket but it is possible for the composition of the invention to be utilized elsewhere on the closure or elsewhere in the container. In that event the gasket-forming composition can be any unaltered conventional composition suitable for forming the gasket.

When the closure is a cap, the subject HSM scavenger composition may form an overall gasket or a portion of an overall gasket. This is typically true for small diameter caps such as those less than 50 mm in diameter. For large diameter caps, the gasket is a ringlike gasket and may be deposited in a conventional manner from the gasket-forming composition. For instance, a ringlike gasket can be formed on a cap by being applied in liquid form as a ring and can then be converted to solid form by drying, heating to cure or cooling to set a thermoplastic, as appropriate. The oxygen scavenging composition could be blended into the gasket material, deposited on the gasket material, or applied to an area of the cap not covered by the gasket (the center panel). The gasket-forming composition may, for this purpose, be a dispersion, latex, plastisol, dry-blend, suitable thermoplastic composition or organic solution. The cap, carrying the gasket, is then pressed on to an appropriate sealing face around the open end of the filled container body and closed in conventional manner.

If the carrier composition is formed with a thermoplastic polymer, it may be applied as a low viscosity melt while the cap is spinning, so as to throw the composition into the form of a ring, or it may be applied as a melt which is then molded into the desired shape, often a disc having a thickened ring-like portion. Further, the gasket can be in the form of a pre-formed ring or disc which is retained (e.g., by mechanical or adhesive means) within the cap.

If the closure is a can end, the HSM oxygen scavenging agent is typically not used in the gasket composition because, under typical can seaming conditions, the gasket is not substantially exposed to oxygen in the pack. Also, the seams are not particularly vulnerable to oxygen ingress. The oxygen scavenging composition is typically applied on a center panel or other interior surface in the can, such as applied as a coating of a can.

It is particularly preferred that the gasket or coating on the container closure be formed by applying a fluid or molten composition of the present invention formed with a fluid polymer matrix and solidifying it on the closure. The method of application and solidification is generally conventional. It is particularly preferred that the container and can end should both be of metal or the container body should be of glass and the closure of metal or plastic, since the use of the defined compositions for forming the gasket then appears to give particularly beneficial results. In particular, excellent results are achievable when the container body is a glass bottle and the closure is a metal cap.

Instead of or in addition to using the fluid or meltable polymer composition of the invention for forming a gasket, it is possible to deposit the composition elsewhere on the inner face of the closure. It may be applied as an overall coating of the inner face of the panel of the closure or it may be applied over only part of the inner face. In particular, when the panel includes one or more push or pull components defined in the panel by discontinuities or lines of weakness the composition may be applied primarily to cover just the discontinuity or line of weakness.

For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. In particular, the composition of the first embodiment of the present invention may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal panel. This can expose the metal to corrosion. Application of a composition of the present invention to a container as described herein can both inhibit corrosion of the metal container as well as improve storage stability of the contents of the container, especially water bearing contents, such as beer.

In addition to use in metal, glass and plastic containers, the compositions can be used in a cardboard or laminated container such as a juice box. Such a container is a cardboard carton or tube with an interior liner. The composition can be placed in or laminated to the interior liner of the cardboard package, along a line of weakness at the package closure, or at any other convenient location in the package. Alternately, the present composition can be placed within the container as a film, mat or sachet.

Further, the composition of the present invention can be compounded and extruded, injection molded or thermoformed into desired shapes when the polymer matrix is a thermoplastic resin. For example, the subject compositions can be formed into films per se or as a component of a film composition used to prepare flexible packaging, such as bags, or the films can be laminated onto metal stock which can then be formed into cans and closures. Also, the compositions may be included in flexible packaging such as multilayer films or laminates or as a ribbon, patch, label or coating on a thermoplastic bag or lidstock. When the subject composition is part of a multi-layer film, the layer formed of the present composition may be the surface layer which will be exposed to the inner surface of the resultant flexible package or an inner layer which is covered by a surface layer having sufficient permeability to permit the $O_2$ and moisture to penetrate into and contact the layer containing the present composition. Thus, the term "exposed to the interior", as used herein and in the appended claims shall mean either direct or indirect exposure of the subject composition to the inner atmosphere of a sealed container having packaged product contained therein.

The compositions can also be used in conjunction with or as a portion of a tamper-evident membrane for pharmaceuticals and foods.

The following examples are given for illustrative purposes only and are not meant to be a limitation on the teaching herein or on the claims appended hereto. All parts and percentages are by weight unless otherwise stated.

Compositions of the present invention were made using both known processes as well as by using novel processes of the present invention, as will be further explained in the examples below.

A known process for making a hydroxosulfitometalate is described at pages 99–108 in *Anorg. Allg. Chem.* 499, Lutz. V. H. D.; Eckers, W.; Buchmeier, W.; Engelen, B. (1983), which is fully incorporated herein by reference. Another helpful reference is Buchmeier, W.; Englene, B.; lutz, H. D. Z. *Naturforsch*. 41b, pages 852–848 (1986), also fully incorporated herein by reference.

The present invention thus provides methods for scavenging oxygen in a container or package, comprising introducing an oxygen scavenging HSM into an article or structure which is to become part of the package, closure, or closure sealant such as a gasket or disc liner. It is also believed that the HSM is operative to scavenge aldehydes as well, and thus the present invention similarly teaches that the inclusion or incorporation of the oxygen scavenging agent into container structures, closures, or sealants are useful for scavenging aldehydes. This is believed particularly useful for metal or plastic cap gasket compositions for glass or plastic bottles or jars. Accordingly, the present invention provides gasket compositions and can sealants incorporating polymeric carriers and HSM, as well as to methods for scavenging oxygen and/or aldehydes which involve introducing HSM into and/or onto polymer carrier to form a scavenging composition for container closures, such as gaskets, coatings, cap liner discs, sealants, and the like.

The present invention also provides novel methods for making hydroxosulfitemetalate (HSM) which are believed surprisingly to provide good HSM yield from relatively inexpensive starting materials, and/or to provide improved oxygen scavenging performance when incorporated within a carrier or supported on a carrier (substrate).

An exemplary method of making HSM comprises: reacting, in aqueous slurry or solution substantially free of oxygen, (1) a metal oxide having the formula $M^{II}O$ or metal hydroxide having the formula $M^{II}(OH)_2$, wherein, in said formulae, $M^{II}$ is a divalent metal cation; and (2) a bisulfite salt having the formula $M^{I}HSO_3$ or a metabisulfite salt having the formula $M^{I}_2S_2O_5$, wherein, in said formulae, $M^{I}$ is a monovalent cation. $M^{I}$ comprises a monovalent inorganic or organic cation such as $Li^+$, $Na^+$, $K^+$, $NH_4^+$, or $NR_4^+$ where R can be hydrogen, an alkyl or aryl moiety, or mixture thereof. $M^{II}$ comprises a divalent metal cation such as $Ca^{2+}$, $Mg^{2+}$, $Mn^{2+}$, $Zn^{2+}$, $Fe^{2+}$, $Co^{2+}$, $Ni^{2+}$, $Cu^{2+}$, or mixture thereof. The term "bisulfite" salt is also intended to encompass reactants or precursors which form bisulfite or would be expected to form bisulfite in situ, e.g., sulfurous acid or source thereof (sulfur dioxide in water) in combination with a base such as a metal hydroxide.

A further exemplary method of the present invention, in which HSM is formed using an morganic support, comprises: reacting a water-soluble source of divalent metal cations with a water-soluble source of sulfite anions, in an aqueous slurry or solution substantially free of oxygen, and in the presence of a non-water-soluble inorganic substrate material.

An exemplary water-soluble source of divalent metal cations (such as $Ca^{2+}$, $Mg^{2+}$, $Mn^{2+}$, $Zn^{2+}$, $Fe^{2+}$, $Co^{2+}$, $Ni^{2+}$, and $Cu^{2+}$) comprises a metal halide $M^{II}X_2$ wherein X is a halide, such as $MgCl_2$. Exemplary water-soluble sources of sulfite anions include a sulfite $M^{I}_2SO_3$, a bisulfite $M^{I}HSO_3$, a metabisulfite $M^{I}_2S_2O_5$, or mixture thereof, wherein $M^{I}$ comprises a monovalent inorganic or organic cation comprising $Li^+$, $Na^+$, $K^+$, $NH_4^+$, or $NR_4^+$ where R can be hydrogen, an alkyl or aryl moiety, or mixture thereof.

Exemplary substantially non-water-soluble inorganic support or substrate include silicas (including colloidal, precipitated, fumed), clays or clay-like particulate materials (e.g., montmorillonite, vermiculite), metal oxides (e.g., spinel $M_gAl_2O_4$), metal hydroxides, hydrotalcites or calcined hydrotalcites, aluminas, and zeolites In the following examples, prior art processes for preparing HSMs are compared to examples provided by novel processes of the present invention for preparing HSM and carrier-supported HSM. All syntheses were carried out using nitrogen or argon-purged water and similar atmospheric pressures e.g., not modified pressures). Samples were made in accordance with the following examples, and their comparative oxygen scavenging capabilities were tested, as will be further discussed below.

EXAMPLE 1

(Prior Art Synthesis of $NaMg_2OH(SO_3)_2.1H_2O$ via $MgCl_2$ and $Na_2SO_3$)

A sample of HSM was synthesized according to process described by Lutz et al. in *Z Anorg. Allg. Chem.* 499, pages 99–108 (1988).

20.3 g (0.1 moles) $MgCl_2.6H_2O$ were dissolved in 79.7 g water. Separately, 12.6 g (0.1 moles) $Na_2SO_3$ were dissolved in 87.4 g water. The two solutions were combined in a 1 L round bottom flask equipped with condenser, magnetic stir bar, and oil bath, then heated to 95° C. for 2 hours during which time a precipitate was formed. The slurry was allowed to cool before vacuum filtering. The filter cake was washed with 1 L of water, then dried in a vacuum oven at 80° C. for 3 hours to yield 0 3.2 g (24%) of a white powder. The X-ray Diffraction (XRD) spectrum indicated the presence of $NaMg_2OH(SO_3)_2.1H_2O$ heavily contaminated with $Na_2SO_3.6H_2O$, and thus the yield was less than what would be expected.

EXAMPLE 2

(Synthesis of MgO-Supported $NaMg_2OH(SO_3)_2.1H_2O$ via $MgCl_2$ and $Na_2SO_3$ in Presence of MgO)

A sample of HSM was synthesized according to an exemplary process of the present invention.

20.3 g (0.1 moles) $MgCl_2.6H_2O$ were dissolved in 79.7 g water. Separately, 12.6 g (0.1 moles) $Na_2SO_3$ were dissolved in 87.4 g water. The two solutions were combined in a 1 L round bottom flask equipped with condenser, magnetic stir bar, and oil bath. 5 g of MgO, 10 mm median particle size (available from Martin Marietta Magnesia Specialties, Baltimore, Md., under the trademark MagChem® 10-325) were added to the solution. The slurry was heated to 95° C. with stirring for 2 hours and then allowed to cool before vacuum filtering. The filter cake was washed with 1 L of water and then dried in a vacuum oven at 80° C. for 4 hours to yield 12.3 g of a fine white powder. The XRD spectrum indicated the presence of MgO and $NaMg_2OH(SO_3)_2.1H_2O$.

EXAMPLE 3

(Synthesis of $SiO_2$-Supported $NaMg_2OH(SO_3)_2.1H_2O$ via $MgCl_2$ and $Na_2SO_3$ in Presence of Precipitated Silica)

The procedure of Example 2 was followed except that silica, commercially sold by W. R. Grace & Co.-Conn, Md., under the trademark SYLOID™ 74, was substituted for MgO. The yield was 6.2 g of a fine white powder.

EXAMPLE 4
(Synthesis of $SiO_2$-Supported $NaMg_2OH(SO_3)_2.1H_2O$ via $MgCl_2$ and $Na_2SO_3$ in Presence of Colloidal Silica (Nalco® 1034A)

20.3 g (0.1 moles) $MgCl_2.6H_2O$ were dissolved in 79.7 g water. 100 g colloidal silica (34% solids, particle size 20 nm, surface area 150 $M^2/g$) available from Nalco Chemical Company, Maperville, Ill., under the trademark Nalco® 1034A, were added with stirring, and the resulting mixture remained transparent and colorless. 12.6 g (0.1 moles) $Na_2SO_3$ were dissolved in 87.4 g water. The two solutions were combined in a 1 L round bottom flask equipped with condenser, magnetic stir bar, and oil bath. The liquid was heated to 95° C. with stirring for 2 hours during which time a fine white precipitate formed. The slurry was allowed to cool. Vacuum filtration of the product was very slow. The filter cake was washed with 100 mL of water and then dried in a vacuum oven at 80° C. for 8 hours to yield 41.2 g of a fine white powder.

EXAMPLE 5
(Synthesis of MgO-Supported $NaMg_2OH(SO_3)_2.1H_2O$ via $Na_2S_2O_5$)

500 mL water were added to a 2 L flask equipped with condenser, magnetic stir bar and oil bath. 47.53 g (0.500 eq.) sodium metabisulfite were dissolved in the water. 20.16 g (0.500 eq.) MagChem® 10-325 (MgO, 10 mm median particle size) were then suspended in the solution and heated to 95° C. with stirring for 6 h. After cooling to room temperature the slurry was vacuum filtered. The filter cake was washed with 2 L of nitrogen-purged water and then dried in a vacuum oven at 80° C. for 8 h to yield 44.7 g of a fine white powder. The XRD spectrum clearly indicated that the HSM and unreacted magnesium oxide were both present at significant levels. There was no contamination with $Na_2SO_3.6H_2O$.

EXAMPLE 6
(Synthesis of MgO-Supported $NaMg_2OH(SO_3)_2.1H_2O$ via $Na_2S_2O_5$, Reduced Metabisulfite)

The procedure of Example 5 was followed except that one half the amount of sodium metabisulfite was used. The yield was 34.3 g of a fine white powder.

EXAMPLE 7
(Synthesis of MgO-Supported $NaMg_2OH(SO_3)_2.1H_2O$ via $Na_2S_2O_5$, Less Heating Time)

The procedure of Example 6 was followed except that the slurry was heated for only one hour. The yield was 31.0 g of a fine white powder.

EXAMPLE 8
(Synthesis of MgO-Supported $NaMg_2OH(SO_3)_2.1H_2O$ via $Na_2S_2O_5$, Ambient Temperature)

The following example illustrates the fact that not heating the reaction results in a lower yield of less active material. The procedure of Example 7 was followed except that the slurry was stirred without heating. The yield was 16.0 g of a fine off-white powder.

EXAMPLE 9
(Synthesis of MgO-Supported $NaMg_2OH(SO_3)_2.1H_2O$ via $NaHSO_3$)

The procedure of Example 7 was followed except that 36.77 g sodium bisulfite were used instead of sodium metabisulfite. The yield was 38.6 g of a fine off-white powder.

EXAMPLE 10
(Synthesis of Spinel-Supported $NaMg_2OH(SO_3)_2.1H_2O$ via $Na_2S_2O_5$)

A quantity of hydrotalcite (available under the mark "HTC 24" from Alcoa, Mg:Al ratio=2.4, carbonate functional) was calcined at 900° C. for 1 hour in a muffle furnace. The XRD spectrum of this material confirmed that it had been converted to magnesium oxide and spinel ($MgAl_2O_4$). 37.5 g sodium metabisulfite were dissolved in 500 mL water in a 2 L flask equipped with condenser, magnetic stir bar and oil bath. 25 g of the calcined hydrotalcite was added and the slurry heated to 95° C. for 1 hour. After cooling to room temperature the slurry was vacuum filtered. The filter cake was washed with 2 L of nitrogen-purged water and then dried in a vacuum oven at 80° C. for 8 hours to yield 42.4 g of a fine white powder. The XRD spectrum of the product revealed that virtually all of the MgO had reacted to form $NaMg_2OH(SO_3)_2.1H_2O$. Spinel was still present.

EXAMPLE 11
(Synthesis of $Mg(OH)_2$-Supported $NaMg_2OH(SO_3)_2.1H_2O$ via $Na_2S_2O_5$)

23.77 g (0.250 eq.) sodium metabisulfite were dissolved in 500 mL argon-purged water in a 1 L round bottom flask equipped with condenser, magnetic stir bar, and oil bath. 20.16 g (0.346 eq.) of magnesium hydroxide ($Mg(OH)_2$, available from Premier Services Corporation, Middleburg Heights, Ohio, under the trademark Brucimag™ S (4 mm median particle size) were added to the solution. The slurry was heated to 95° C. with stirring for 1 hour and then allowed to cool before vacuum filtering. The filter cake was washed with 2 L of nitrogen-purged water and then dried in a vacuum oven at 80° C. for 8 hours to yield 27.4 g of a fine white powder. The XRD spectrum clearly indicated that the HSM and unreacted magnesium hydroxide were both present at significant levels.

EXAMPLE 12
(Reaction of $Mg(OH)_2$ with $Na_2SO_3$)

The following example concerns a synthesis wherein the less preferred use of a sulfite salt, instead of a preferred acidic bisulfite or metabisulfite salt as the reagent, is illustrated. The procedure of Example 11 was followed except that sodium sulfite was used instead of sodium metabisulfite. The yield was 18.8 g of a fine white powder.

EXAMPLE 13
(Synthesis of MnO-Supported $NaMn_2OH(SO_3)_2.1H_2O$ via $Na_2S_2O_5$)

The procedure of Example 11 was followed except that MnO was substituted for $Mg(OH)_2$. The yield was 25.7 g of a mixture of green and white powders.

EXAMPLE 14
(Synthesis of ZnO-Supported $NaZn_2OH(SO_3)_2.1H_2O$ via $Na_2S_2O_5$)

The procedure of Example 11 was followed except that ZnO was substituted for $Mg(OH)_2$. The yield was 38.1 g of a fine white powder.

EXAMPLE 15
(Comparative Example Synthesis of $NaFe_2OH(SO_3)_2.1H_2O$ via $FeCl_2$ and $Na_2SO_3$)

The following synthesis was adapted from the literature. 66.36 g (0.488 moles) sodium acetate trihydrate were dissolved in 200 g water in a 500 mL round bottom flask equipped with condenser, magnetic stir bar, and oil bath.

20.0 g (0.159 moles) sodium sulfite were added and dissolved. 15.69 g (0.079 moles) iron(II) chloride tetrahydrate were added and dissolved. The solution was heated to 105° C. for 1 h while stirring and gently bubbling a stream of $SO_2$ through it. Within 20 min. a thick precipitate had formed. The slurry was allowed to cool under an argon blanket. The solids were filtered and dried in a vacuum oven at 80° C. for 8 hours to yield 5.6 g of a fine golden-brown powder.

EXAMPLE 16
(Synthesis of $Co(OH)_2$-Supported $NaCo_2OH(SO_3)_2.1H_2O$ via $Na_2S_2O_5$)

32.5 g (0.342 eq.) sodium metabisulfite were dissolved in 500 mL argon-purged water in a 1 L round bottom flask equipped with condenser, magnetic stir bar, and oil bath. 20.0 g (0.346 eq.) $Co(OH)_2$(95% purity) were added to the solution. The slurry was heated to 95° C. with stirring for 1 hour and then allowed to cool before vacuum filtering. The filter cake was washed with 2 L of nitrogen-purged water and then dried in a vacuum oven at 80° C. for 8 hours to yield 34.0 g of a lavender powder.

Moisture-triggered oxygen scavenging test method. The scavengers were weighed and placed in gas impermeable pouches fitted with septa and heat sealed under vacuum. In some cases, 1.0 g samples were used, and in other cases 0.2 g samples were used. In either case, an equal weight of water followed by 100 cc of air were introduced through the septa. The oxygen content of each pouch was measured at regular intervals thereafter by withdrawing 3 cc samples of the atmosphere in the pouches via gas syringe and injecting into a MOCON® model HS 750 Headspace Oxygen Analyzer. Samples were usually measured in duplicate or triplicate. Selected samples without added water were also monitored to test stability. In all cases, these showed no significant scavenging activity. The results, transformed into scavenging rates and capacities per gram of scavenger, are shown in Table I below. Often, the 1.0 gram samples had enough capacity to react with all of the oxygen in the pouch so that accurate capacity determinations could not be made; and in the cases involving 0.2 gram samples (indicated in Table I), the capacity was nearly exhausted after one week.

Sulfite/Sulfate Migration from PVC Compounds

Closure compounds containing the magnesium HSM from example 7 were exposed to water and low levels of oxygen to simulate conditions inside a food or beverage package packed under nitrogen. After 10 days the water was analyzed for the expected migration products, sulfite and/or sulfate. The scavenger was evaluated both as is and also after grinding with a mortar and pestle. Compounds containing milledsodium sulfite were included as controls. All scavengers were evaluated at a 3% loading level. The details of the testing are as follows:

a) The scavenging materials were stirred into a PVC plastisol closure compound. The plastisols were then poured into circular molds and fused at 215° C. for 3.5 min. to form discs weighing approximately 2 g.

b) The scavenging materials were blended into a PVC dryblend closure compound by vigorous shaking for one hour followed by fluxing in a Brabender mixing chamber at 30 rpm and 165° C. for 5 min. Sheets were then formed on a hot press at 300° F. Discs weighing approximately 330 mg were punched out.

The discs were placed in gas impermeable pouches (1 disc per pouch for plastisol compounds, 6 discs per pouch for dryblend compounds) fitted with septa and heat sealed under vacuum. Two grams of ultrapure water and 100 cc of an approx. 1% oxygen/99% nitrogen blend were then introduced through the septa. The pouches were then pasteurized at 60° C. for 45 min. Samples were prepared in triplicate. After 10 days, the liquid contents were withdrawn and fixed with 1% aqueous. formaldehyde so that sulfite/bisulfite would not oxidized further; the samples were then analyzed

TABLE I

Hydroxosulfitometalates.
$NaM_2OH(SO_3)_2.H_2O$, M = Mg, Mn, Zn, Fe, Co.

| Example # | DESCRIPTION | RATE[†] @ 1 day (mmoles $O_2$/g/day) | CAPACITY[†] @ 1 week (mmoles $O_2$/g/day) |
|---|---|---|---|
|  | Control milled sodium sulfite | 40[†] | 350[†] |
| 1 | Mg; literature method | 5 | 30 |
| 2 | Mg; supported on MgO | n.a. | 780+ |
| 3 | Mg; supported on pptd silica | 330 | 350 |
| 4 | Mg; supported on colloidal silica | 550 | 720+ |
| 5 | Mg; formed from MgO + $Na_2S_2O_5$ | 500 | 780+ |
| 6 | Mg; without $Na_2S_2O_5$ (less) | 520[†] | 1080[†] |
| 7 | Mg; less reaction time | 720 | 790+ |
| 8 | Mg; 25° C. reaction | 210 | 440 |
| 9 | Mg; from MgO + $NaHSO_3$ | 590 | 790+ |
| 10 | Mg; supported on spinel | 1070[†] | 920[†] |
| 11 | Mg; from $Mg(OH)_2$ + $Na_2S_2O_5$ | 650 | 800+ |
| 12 | Mg; from $Mg(OH)_2$ + $Na_2SO_3$ | 20 | 40 |
| 13 | Mn; from MnO + $Na_2S_2O_5$ | 120 | 430 |
| 14 | Zn; from ZnO + $Na_2S_2O_5$ | 20 | 370 |
| 15 | Fe; literature method | 1060[†] | 1930[†] |
| 16 | Co; formed from $(OH)_2$ + $Na_2S_2O_5$ | 800[†] | 1330[†] |

[†]0.2 gram samples by ion chromatography for sulfite and sulfate content. The results are shown in Table 2 below:

TABLE 2

| Sample | Sulfates (ppm) | Sulfites (ppm) |
|---|---|---|
| PVC Plastisols | | |
| Milled sodium sulfite | 3870 ± 426 | 58 ± 73 |
| Scavenger from Ex. 7 | 256 ± 70 | 14 ± 20 |
| Scavenger from Ex. 7, ground | 156 ± 55 | 13 ± 18 |
| PVC Dryblends | | |
| Milled sodium sulfite | 955 ± 59 | <DL† |
| Scavenger from Ex. 7 | 88 ± 8 | <DL† |
| Scavenger from Ex. 7, ground | 70 ± 10 | <DL† |

†Detection Limit = 0.15 ppm

The sulfate which has migrated from these samples derives from sulfite oxidation, and so the total amount of these two species which has migrated from a given sample is the indicator of potential exposure to sulfite itself. It can be seen that in all cases the HSM exhibits migration at least one order of magnitude and in some cases almost 25 times lower than the sodium sulfite control.

The invention is not intended to be limited by any of the examples or embodiments above which are provided for illustrative purposes only.

I claim:

1. A composition comprising: a carrier having an oxygen scavenger hydroxosulfitometalate represented by the formula

$$M^I M^{II}{}_2 OH(SO_3)_2 \cdot H_2O$$

wherein $M^I$ is a monovalent cation; and $M^{II}$ is a divalent metal cation.

2. The composition of claim 1 wherein $M^I$ comprises a monovalent inorganic or organic cation comprising $Li^+$, $Na^+$, $K^+$, $NH_4^+$, or $NR_4^+$ where R is hydrogen, an alkyl or aryl moiety, or mixture thereof.

3. The composition of claim 1 wherein $M^{II}$ is a divalent metal cation comprising $Ca^{2+}$, $Mg^{2+}$, $Mn^{2+}$, $Zn^{2+}$, $Fe^{2+}$, $Co^{2+}$, $Ni^{2+}$, $Cu^{2+}$, or mixtures thereof.

4. The composition of claim 1 wherein $M^I$ comprises a monovalent inorganic or organic cation comprising $Li^+$, $Na^+$, $K^+$, $NH_4^+$, or $NR_4^+$ where R is hydrogen, an alkyl or aryl moiety, or mixture thereof; and wherein $M^{II}$ is a divalent metal cation comprising $Ca^{2+}$, $Mg^{2+}$, $Mn^{2+}$, $Zn^{2+}$, $Fe^{2+}$, $Co^{2+}$, $Ni^{2+}$, $Cu^{2+}$, or mixture thereof.

5. The composition of claim 4 wherein said carrier comprises a polymer, and said hydroxosulfitometalate is present in the amount of at least 0.05% weight based on the total weight of the composition.

6. The composition of claim 5 wherein said polymer comprises a thermoplastic resin selected from the group consisting of polyethylene, ethylene/vinyl acetate copolymers, vinyl chloride homopolymers, vinyl chloride copolymers and blends thereof.

7. The composition of claim 6 wherein said polymer comprises a polyethylene selected from the group consisting of high, low, very low, ultra low, and linear low density polyethylenes, blends thereof, and blends of said polyethylene with other polymers.

8. The composition of claim 7 wherein the carrier comprises a mixture of at least one polyethylene and at least one ethylene/vinyl acetate copolymer.

9. The composition of claim 7 wherein said carrier comprises a polymer selected from the group consisting of polyolefin, ethylene/vinyl acetate copolymer, butyl rubber, styrene/butadiene rubber, styrenelbutadiene/styrene block copolymers, isoprene, styrene/isoprene/styrene block copolymers styrene/ethylene/butylene/styrene block copolymers, and mixtures thereof.

10. The composition of claim 1 wherein said carrier comprises a polymer comprising one or more vinyl chloride resin.

11. The composition of claim 1 wherein said carrier comprises an epoxide, phenolic, polyurethane, polyvinyl chloride homopolymer, polyvinyl chloride copolymers and mixtures thereof.

12. The composition of claim 1 wherein said carrier comprises a vinyl chloride resin and at least one plasticizer.

13. A product that is a container having an interior cavity suitable to contain an oxygen sensitive material which has, as at least part of said container and exposed to the interior of said container, the composition of claim 1.

14. A product that is a container having an interior cavity suitable to contain an oxygen sensitive material which has, as at least part of said container and exposed to the interior of said container, the composition of claim 6.

15. The composition of claim 1 wherein said carrier comprises a matrix into which said hydroxosulfitometalate is incorporated, a film into which and/or onto which said hydroxosulfitometalate is incorporated, a mat into which and/or onto which said hydroxosulfitometalate is incorporated, a sachet or pouch into which said hydroxosulfitometalate is incorporated, or combination of the foregoing.

16. A method of making hydroxosulfitometalate comprising: reacting, in aqueous slurry or solution substantially free of oxygen, (1) a metal oxide having the formula $M^{II}O$ or a metal hydroxide having the formula $M^{II}(OH)_2$, wherein, in said formulae, $M^{II}$ is a divalent metal cation; and (2) a bisulfite salt having the formula $M^I HSO_3$ or a metabisulfite salt having the formula $M^I{}_2 S_2 O_5$, wherein, in said formulae, $M^I$ is a monovalent cation.

17. The method of claim 16 wherein $M^I$ comprises a monovalent inorganic or organic cation comprising $Li^+$, $Na^+$, $K^+$, $NH_4^+$, or $NR_4^+$ where R is hydrogen, an alkyl or aryl moiety, or mixture thereof.

18. The method of claim 16 wherein $M^{II}$ is a divalent metal cation comprising $Ca^{2+}$, $Mg^{2+}$, $Mn^{2+}$, $Zn^{2+}$, $Fe^{2+}$, $Co^{2+}$, $Ni^{2+}$, $Cu^{2+}$, or mixture thereof.

19. The method of claim 16 wherein $M^I$ comprises a monovalent inorganic or organic cation comprising $Li^+$, $Na^+$, $K^+$, $NH_4^+$, or $NR_4^+$ where R is hydrogen, an alkyl or aryl moiety, or mixture thereof; and wherein $M^{II}$ is a divalent metal cation comprising $Ca^{2+}$, $Mg^{2+}$, $Mn^{2+}$, $Zn^{2+}$, $Fe^{2+}$, $Co^{2+}$, $Ni^{2+}$, $Cu^{2+}$, or mixture thereof.

20. A method of making hydroxosulfitometalate, comprising: reacting a water-soluble source of divalent metal cations with a water-soluble source of sulfite anions, in an aqueous slurry or solution substantially free of oxygen, and in the presence of a substantially non-water-soluble inorganic substrate material.

21. The method of claim 20 wherein the water-soluble source of divalent metal cations comprises a metal halide $M^{II}X_2$ wherein X is a halide.

22. The method of claim 20 wherein the divalent metal cations are selected from the group consisting of $Ca^{2+}$, $Mg^{2+}$, $Mn^{2+}$, $Zn^{2+}$, $Fe^{2+}$, $Co^{2+}$, $Ni^{2+}$, and $Cu^{2+}$.

23. The method of claim 20 wherein the water-soluble source of sulfite anions comprises a sulfite $M^I{}_2 SO_3$, a bisulfite $M^I HSO_3$, a metabisulfite $M^I{}_2 S_2 O_5$, or mixture thereof, wherein $M^I$ comprises a monovalent inorganic or organic cation comprising $Li^+$, $Na^+$, $K^+$, $NH_4^+$, or $NR_4^+$ where R is hydrogen, an alkyl or aryl moiety, or mixture thereof.

24. The method of claim 20 wherein said substantially non-water-soluble inorganic support material comprises a silica, a clay or clay-like particulate material, metal oxide, metal hydroxide, hydrotalcite or calcined hydrotalcite, alumina, zeolite, or mixture thereof.

25. The composition of claim 25 wherein said polymer comprises a polyethylene, a polypropylene, or blends thereof.

26. The composition of claim 25 wherein said polymer comprises a polyethylene.

27. The composition of claim 25 wherein said polymer comprises a polypropylene.

* * * * *